W. H. VAN WORMER,

Assignor, by mesne assignments, to THE METALLIC HEEL STIFFENER CO.

Counter-Support for Boots and Shoes.

No. 9,030. Reissued Jan. 6, 1880.

Witnesses:

Ernest C. Webb.

Arthur Webb.

Inventor:

William H. Van Wormer,

By J. C. Clayton

Atty.

UNITED STATES PATENT OFFICE.

WILLIAM H. VAN WORMER, OF PIERCETON, INDIANA, ASSIGNOR, BY MESNE ASSIGNMENTS, TO THE METALLIC HEEL STIFFENER COMPANY.

COUNTER-SUPPORT FOR BOOTS AND SHOES.

SPECIFICATION forming part of Reissued Letters Patent No. 8,030, dated January 6, 1880.

Original No. 197,696, dated November 27, 1877. Application for Reissue filed September 24, 1879.

*To all whom it may concern:*

Be it known that I, WILLIAM H. VAN WORMER, of Pierceton, in the county of Kosciusko and State of Indiana, have invented a new and useful Improvement in Counter-Stays for Boots and Shoes, of which the following is a specification, reference being had to the accompanying drawings, illustrating the improvement.

The nature of the present invention consists in two plates of metal formed to fit the sides of the counter between the two layers of leather. The sides of the plates are rounded down at their ends, and are placed between the heel and side seams, so as to bring the inside of the counter even and smooth, and the lower parts thereof are brought under the insole, that they may be secured by the pegs or nails which hold the heels in place.

I accept as the state of the art that single heel-plates of metal have been placed back of the counters and between the layers of leather; but the distinction is that my improvement in two plates permits a free action of the heel of a person in a boot or shoe, and allows a lateral movement of an easy nature, and cannot injure or cramp the heel, as when inclosed in the most tender part by an unyielding material. Further, my object is to prevent boots and shoes from running over at the side of the heels—a desired attainment which cannot be prevented by sole use of leather.

Figure 1:
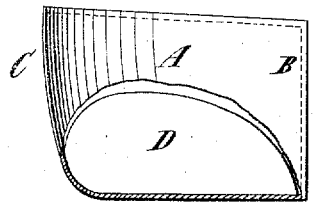
Figure 2:
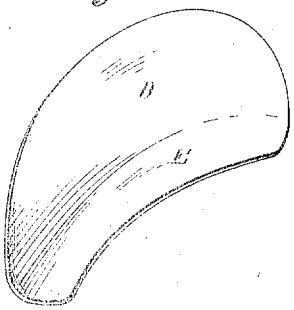
Figure 2A:
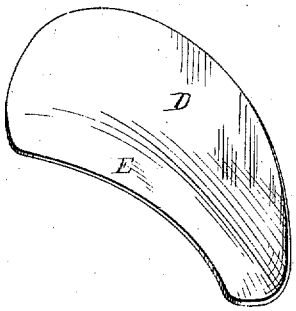
Figure 3:
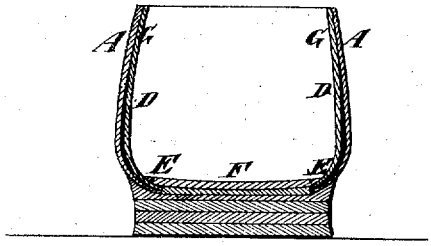

In the drawings, Figure 1 is a side elevation of a boot-counter with the outer leather removed to show the side plate or stiffener. Fig. 2 is a perspective view of a right, and Fig. 2ª is a similar view of a left, of the two metal pieces constituting my improved counter-stiffener on an enlarged scale; Fig. 3, a cross-section of the counter and plate.

Similar letters of reference indicate corresponding parts in all the figures.

A represents the counter of a boot, B being the seam for uniting it with the vamp, and C the seam or stitching in the middle of the counter, conforming to the ordinary construction. G represents the lining of the counter A, both parts requiring nothing better than such upper-leather as the boot is made of, as to material, although a much poorer grade of leather may be used for the lining G.

On each side of the back seam or stitching, C, and between the seams B, is placed my improved counter stay or support D E, which is made of soft iron or spring-brass, formed to correspond to the contour of the counter A, so far as it extends, the lower part thereof extending under the insole F, that the pegs or nails which hold the heel on may hold the support in position.

One of the plates D E is adapted to the right side and half of the end of the counter, and the other plate D E is adapted to the left side and half of the end of the counter—in other words, one plate is a right and the other is a left. When the two pieces or plates D E are in place on a boot or shoe the vertical portions D conform to the curve of the counter and the horizontal portions E conform to the surface of the heel-sole.

In the manufacture of the stiffeners sizes are selected to conform to the numbers of boots or shoes, and to attain uniformity in the construction dies for each sized stiffener should be employed. In practice, except for very heavy work, No. 18 sheet metal will answer the purpose, and be easy for the heel of a person, as it will spring and permit a free lateral movement.

What I claim as my invention, and desire to secure by Letters Patent, is—

1. A counter-stiffener composed of a right and a left piece, D E, constructed and adapted for use substantially as set forth.

2. A boot or shoe provided with the side sectional counter-stiffeners D E, adapted, as shown and described, to be placed between the counter A and lining G, as and for the purpose stated.

WILLIAM H. VAN WORMER.

Witnesses:

W. S. MARSHALL,

I. L. AYRES.